Figure 1:
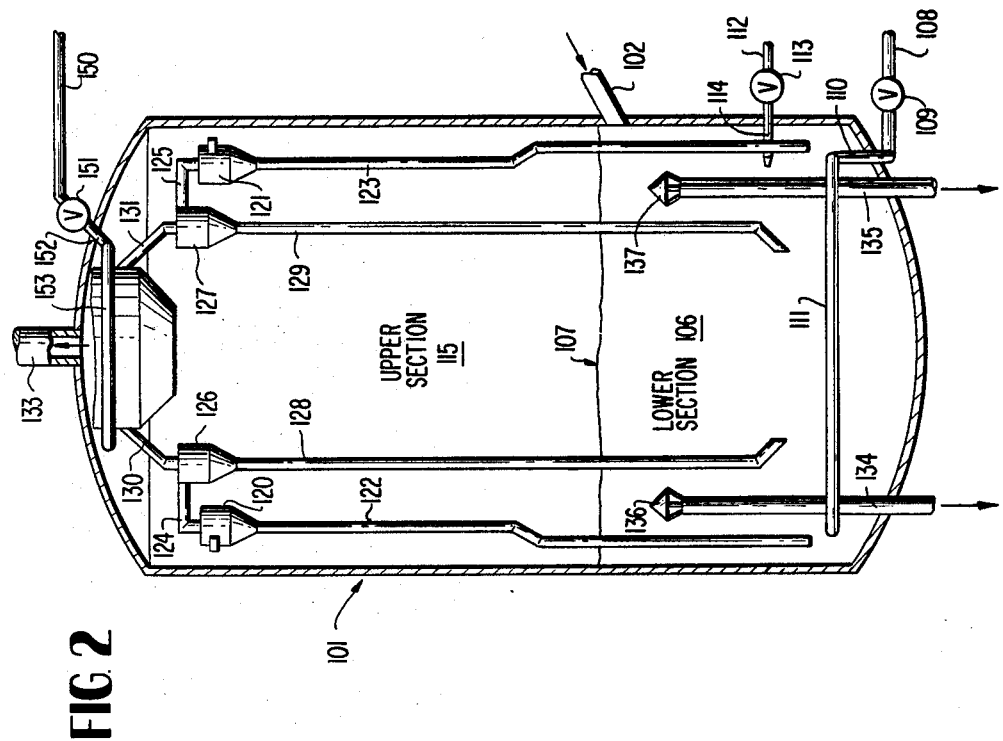

United States Patent [19]

Bertolacini et al.

[11] 4,341,660

[45] Jul. 27, 1982

[54] CATALYTIC CRACKING CATALYST

[75] Inventors: Ralph J. Bertolacini, Chesterton; William L. Forsythe, Jr., Munster, both of Ind.

[73] Assignee: Standard Oil Company (Indiana), Chicago, Ill.

[21] Appl. No.: 225,712

[22] Filed: Jan. 16, 1981

Related U.S. Application Data

[60] Division of Ser. No. 158,613, Jun. 11, 1980, which is a continuation of Ser. No. 963,991, Nov. 27, 1978, abandoned, which is a continuation of Ser. No. 664,057, Mar. 4, 1976, abandoned, which is a continuation-in-part of Ser. No. 447,753, Mar. 4, 1974, abandoned.

[51] Int. Cl.³ .................... B01J 29/12; B01J 29/16
[52] U.S. Cl. .................... 252/455 Z; 208/120
[58] Field of Search .................... 252/455 Z; 208/120

[56] References Cited

U.S. PATENT DOCUMENTS

| | | | |
|---|---|---|---|
| 3,312,615 | 4/1967 | Cramer et al. | 208/120 |
| 3,364,136 | 1/1968 | Chen et al. | 208/120 |
| 3,788,977 | 1/1974 | Dolbear et al. | 208/120 |
| 3,835,031 | 9/1974 | Bertolacini et al. | 208/120 |
| 4,072,600 | 2/1978 | Schwartz | 208/120 |
| 4,108,795 | 8/1978 | Hemler et al. | 252/419 |
| 4,151,121 | 4/1979 | Gladrow | 252/455 Z |

*Primary Examiner*—Carl F. Dees
*Attorney, Agent, or Firm*—Bernard, Rothwell & Brown

[57] ABSTRACT

An improved fluid catalytic cracking process comprises a method for the regeneration of the fluidizable hydrocarbon conversion catalyst, particularly of the molecular sieve type, which has been deactivated with coke deposits while employed in a hydrocarbon catalytic cracking process, in which the coke-containing hydrocarbon conversion catalyst is contacted with an oxygen-containing gas to burn the coke from the catalyst under conditions providing substantially complete combustion of carbon monoxide and substantially complete combustion of the coke on the catalyst. In the regenerator, particles of the hydrocarbon conversion catalyst are in association with particles of a platinum group metal or rhenium oxidation catalyst which promotes the combustion of carbon monoxide to carbon dioxide. The catalyst composite contains a mixture of cracking catalyst particles and particles having the platinum group metal or rhenium oxidation catalyst supported on a substrate. Evolved heat is recovered by direct heat transfer to the catalyst, for example within a dilute or dense phase zone in the regenerator vessel. The gaseous effluent from the regenerator has a low content of carbon monoxide and may be discharged directly to the atmosphere with little discernible effect upon ambient air quality. The regenerated hydrocarbon conversion catalyst may have less than about 0.05 weight percent coke thereon.

11 Claims, 2 Drawing Figures

CATALYTIC CRACKING CATALYST

This is a division of application Ser. No. 158,613, filed June 11, 1980, which in turn is a continuation of application Ser. No. 963,991, filed Nov. 27, 1978, now abandoned, which in turn is a continuation of application Ser. No. 664,057, filed Mar. 4, 1976, now abandoned, which in turn is a continuation-in-part of application Ser. No. 447,753, filed Mar. 4, 1974, now abandoned.

This invention relates to an improved fluid catalytic conversion process, including an improved process for the regeneration of catalyst employed in fluid catalytic conversion of hydrocarbon feedstocks wherein the catalyst is deactivated by the deposition of coke on the catalyst surfaces. By the process of this invention, regeneration of conversion catalysts, particularly fluid cracking catalysts, may be sustained over a long period of operation while enabling the coke level on the regenerated catalyst to be maintained at beneficially low levels. The regeneration process of this invention may frequently provide a flue gas stream having an extremely low carbon monoxide content.

In accordance with the process of this invention, particles of the catalyst for the fluid catalytic conversion operation, particularly catalyst of the molecular sieve type, are in association with finely-divided particles containing platinum group metal or rhenium oxidation catalyst, when the mixed catalyst particles undergo regeneration. The oxidation catalyst exhibits an activity for promoting the oxidation of carbon monoxide to carbon dioxide in the presence of molecular oxygen, and frequently has little, if any, adverse effect on the catalytic conversion operation. The regeneration of the fluid catalyst may be conducted by passing an oxygen-containing regeneration gas stream into contact with the catalyst wherein the amount of oxygen supplied to the catalyst is at least that stoichiometrically sufficient for complete oxidation of the coke deposited on the catalyst at a temperature of at least that required to maintain sustained catalytic oxidation of carbon monoxide by oxidation of coke on the catalyst. The gaseous effluent from the regeneration of the catalyst may be very low in carbon monoxide content, thereby reducing the emission of this highly toxic material to the atmosphere, or eliminating or reducing the necessity to treat the effluent from the catalyst regeneration unit to convert carbon monoxide to relatively innocuous carbon dioxide.

The process of this invention contemplates the contacting of a deactivated fluid conversion catalyst, such as a fluidizable molecular sieve-type hydrocarbon cracking catalyst, deactivated by the deposition thereon of carbonaceous deposits or coke and stripped with steam, with an oxygen-containing regeneration gas to burn coke from the catalyst. The conditions employed effect substantially complete combustion of the coke and resulting carbon monoxide, and provision is made for recovery of the major amount of evolved heat by transfer directly to the catalyst, for example, within a dilute or dense phase zone in the regenerator vessel.

The process of this invention provides a regenerated, hydrocarbon conversion catalyst having a very low coke content, e.g., no more than about 0.10 weight percent, desirably less than about 0.05, e.g., up to about 0.03, weight percent, and preferably within the range from about 0.01 to 0.03 weight percent, by control of the substantially complete combustion of coke therefrom, together with substantially complete combustion of carbon monoxide gas present or formed during regeneration of the catalyst. The process is characterized by having a platinum group metal or rhenium oxidation catalyst in association with the hydrocarbon conversion catalyst, and the oxidation catalyst may be in the form of a solid, metal oxide-containing material. The process employs regeneration temperatures which are sufficiently high to activate the oxidation catalyst to promote substantially complete oxidation of carbon monoxide and for the substantially complete combustion of the coke deposit on the conversion catalyst. The temperatures are not so high that the conversion catalyst particles become thermally deactivated or that the regeneration vessel and its internals become unsafe or inoperative. The regeneration temperatures may advantageously range from about 1000°, or about 1200°, to about 1500° F., desirably from about 1050° to about 1400° F. These combustion temperatures are achieved by the use of the oxidation catalysts, as more fully described below.

An outstanding advantage of this invention lies in providing a regenerated catalyst generally possessing enhanced activity and selectivity characteristics more closely approaching those of fresh conversion catalyst, particularly for use in conversions effected at very short contact times in riser reactors. Accordingly, higher conversions of feedstock and higher yields of desirable conversion products may be achieved. The oxidation catalyst assists in stabilizing regenerator control by controlling the oxidation of carbon monoxide. Moreover, the risk of extinguishing the oxidation of the carbon monoxide through drop in temperature, increase in gas velocity which may cause blowout, or reduction in carbon monoxide content, is substantially abated since the oxidation of the carbon monoxide may be conducted catalytically. In those regeneration processes using a lower dense phase zone and an upper dilute phase zone in the regenerator, the oxidation of the carbon monoxide to carbon dioxide may be accomplished to a major extent, often at least about 60 percent, and frequently about 65 to 95 percent or more, to completion in the dense catalyst phase of the fluid catalyst regenerator. The oxidation of carbon monoxide to carbon dioxide in the dense phase provides heat to aid in sustaining the combustion of the coke deposits from the fluid catalyst. Furthermore, with a substantial portion of the carbon monoxide being oxidized in the dense phase, a lesser amount of carbon monoxide is present for combustion in the upper phase of the fluid catalyst in the regenerator, and thus "afterburning" and high temperatures due to uncontrolled excessive carbon monoxide combustion in the upper portion of the fluidized catalyst in the regenerator which may deleteriously affect materials employed to construct the reactor, waste gas flue, and collectors for any particulate materials n the waste gas, e.g., cyclones, and which may impair catalyst activity, may be substantially reduced or avoided.

The carbon monoxide content of the flue gas from this novel regeneration process may be maintained at less than about 1.0 volume percent, e.g., less than about 0.2 volume percent, such as about 500 to 1000 parts per million by volume (ppmv). Advantageously, the content is even lower, for example, within the range from 0 to about 500 ppmv. This low concentration of carbon monoxide in the flue gas stream permits the direct release of effluent gases to the atmosphere while meeting ambient air quality standards. This advantage of the invention additionally permits the elimination of capital expenditures otherwise required for installation of carbon monoxide boilers and associated turbine-type devices or other means for partial recovery of energy produced by the subsequent oxidation of the carbon monoxide.

The novel regeneration process of this invention is advantageously practiced as a step in a fluid catalytic cracking process, especially where at least a substantial portion of the conversion is effected in a dilute phase transfer line or riser reactor system utilizing very active catalysts employed at relatively high space velocities. The low coke level on the regenerated catalyst is especially preferred when employing fluid cracking catalysts containing catalytically-active, crystalline aluminosilicates, otherwise known as zeolites or "molecular sieves." The cracking activity of sieve-containing catalysts and their selectivity for converting hydrocarbon feeds to desired products are both dramatically affected in a favorable direction by the increased elimination of residual carbon or coke on the catalyst during regeneration. A particularly suitable hydrocarbon conversion process for the practice of this invention comprises the fluid catalytic cracking process for the conversion of gas oils and heavier hydrocarbon stocks to lower boiling hydrocarbon components suitable for blending into fuels for automotive engines, jet power plants domestic and industrial furnaces, and the like.

Catalytic cracking of heavy mineral oil fractions is one of the major refining operations employed in the conversion of crude oils to desirable fuel products such as high-octane gasoline fuels used in spark-ignited, internal combustion engines. Illustrative of "fluid" catalytic conversion processes is the fluid catalytic cracking process wherein high molecular weight hydrocarbon liquids or vapors are contacted with hot, finely-divided, solid catalyst particles, either in a fluidized bed reactor or in an elongated riser reactor, and the catalyst-hydrocarbon mixture is maintained at an elevated temperature in a fluidized or dispersed state for a period of time sufficient to effect the desired degree of cracking to lower molecular weight hydrocarbons typically present in motor gasolines and distillate fuels. Suitable hydrocarbon feeds boil generally above the gasoline boiling range, e.g., within the range from about 400° to about 1200° F., and are usually cracked at temperatures ranging from about 850° to 1050° F.

In the catalytic process some non-volatile carbonaceous material, or "coke", is deposited on the catalyst particles. Coke comprises highly condensed aromatic hydrocarbons which generally contain a minor amount of hydrogen, say about 4 to 10 weight percent. As coke builds up on the catalyst, the activity of the catalyst for cracking and the selectivity of the catalyst for producing gasoline blending stocks diminish. The catalyst particles may recover a major proportion of their original capabilities by removal of most of the coke therefrom in a suitable regeneration process.

Catalyst regeneration is accomplished by burning the coke deposits from the catalyst surface with a molecular oxygen-containing gas, such as air. Many regeneration techniques are practiced commercially whereby a significant restoration of catalyst activity is achieved in response to the degree of coke removal. As coke is progressively removed from the catalyst, removal of the remaining coke becomes most difficult and, in practice, an intermediate level of restored catalyst activity is accepted as an economic compromise.

The burning of coke deposits from the catalyst requires a large volume of oxygen or air. Oxidation of coke may be characterized in a simplified manner as the oxidation of carbon and represented by the following chemical equations:

(a) $C + O_2 \rightarrow CO_2$
(b) $2C + O_2 \rightarrow 2CO$
(c) $2CO + O_2 \rightarrow 2CO_2$.

Reactions (a) and (b) both occur under typical catalyst regeneration conditions wherein the catalyst temperature may range from about 1050° to about 1300° F. and are exemplary of gas-solid chemical interactions when regenerating catalyst at temperatures within this range. The effect of any increase in temperature is reflected in an increased rate of combustion of carbon and a more complete removal of carbon, or coke, from the catalyst particles. As the increased rate of combustion is accompanied by an increased evolution of heat, whenever sufficient free or molecular oxygen is present, the gas-phase reaction (c) may occur. This latter reaction is initiated and propagated by free radicals.

A major problem often encountered and sought to be avoided in the practice, particularly of fluid catalyst regeneration, is the phenomenon known as "afterburning", described, for example, in Hengstebeck, *Petroleum Processing*, McGraw-Hill Book Co., 1959, at pages 160 and 175 and discussed in *Oil and Gas Journal*, Volume 53 (No. 3), 1955, at pages 93-94. This term is descriptive of the further combustion of CO to $CO_2$, as represented by reaction (c) above, which is highly exothermic. Afterburning has been vigorously avoided in catalyst regeneration processes because it could lead to very high temperatures which may damage equipment and cause permanent deactivation of catalyst particles. Many fluid catalyst regenerator operations have experienced afterburning, and a very substantial body of art has developed around numerous means for controlling regeneration techniques so as to avoid afterburning. More recently, it has been sought to raise regenerator temperatures for various reasons; elaborate arrangements have also been developed for control of regenerator temperatures at the point of incipient afterburning by suitable means for control of the oxygen supply to the regenerator vessel as set forth, for example, in U.S. Pat. Nos. 3,161,583 and 3,206,393, as well as in U.S. Pat. No. 3,513,087. In typical contemporry practice, accordingly, with avoidance of afterburning, the flue gas from catalyst regenerators usually contains very little oxygen and a substantial quantity of carbon monoxide and carbon dioxide in nearly equimolar amounts.

Further combustion of carbon monoxide to carbon dioxide is an attractive source of heat energy because reaction (c) is high exothermic. Afterburning can proceed at temperatures above about 1100° F. and liberates approximately 4350 BTU per pound of carbon monoxide oxidized. This typically represents about one-fourth of the total heat evolution realizable by combustion of coke. The combustion of carbon monoxide can be performed controllably in a separate zone or carbon monoxide boiler, after separation of effluent gas from catalyst, as described in, for example, U.S. Pat. No. 2,753,925, with the released heat energy being employed in various refinery operations such as the generation of high pressure steam. Other uses of such heat energy have been described in U.S. Pat. Nos. 3,012,962 and 3,137,133 (turbine drive) and U.S. Pat. No. 3,363,993 (preheating of petroleum feedstock). Such heat recovery processes require separate and elaborate equipment but do serve to minimize the discharge of carbon monoxide into the atmosphere as a component of effluent gases, and hence, serve to avoid a potentially serious pollution hazard.

Silica-alumina catalysts, employed conventionally for many years in various processes for the cracking of petroleum hydrocarbons, are not particularly sensitive to the level of residual coke on catalyst provided that the coke level be no greater than about 0.5 weight percent. However, silica-alumina catalysts have largely been supplanted by catalysts additionally incorporating a crystalline aluminosilicate component and known as zeolites or "molecular sieves". The molecular sieve-containing catalysts are much more sensitive to the residual coke level, being greatly affected both with regard to catalyst activity and to catalyst selectivity for conversion of feed to the desired product or products. Due to the difficulties encountered in conventional catalyst regeneration techniques for removal of the last increments of residual carbon, the practical coke level usually corresponds to a residual coke content on regenerated catalyst within the range from about 0.2 to about 0.3 weight percent.

Since enhanced activity and selectivity are achievable with sieve-type cracking catalysts at low coke levels, an attractive incentive is provided for discovering a means for reducing residual coke levels still further. Coke levels below about 0.05 weight percent are greatly desired but usually cannot be achieved by commercially practicable means. Considerations such as larger regeneration vessels, greater catalyst inventory, greater heat losses, and the like, all serve to discourage attainment of such ideal equilibrium catalyst activity levels.

U.S. patent application Ser. No. 262,049, filed June 12, 1972, incorporated herein by reference, now issued as U.S. Pat. No. 3,909,392, from the continuation application Ser. No. 472,111, filed May 22, 1974, is directed to an improved catalytic cracking process, including an improved process for the regeneration of catalysts employed in fluid catalytic conversion of hydrocarbon feedstocks wherein the catalyst is deactivated by the deposition of coke on the catalytic surfaces. The process enables the coke level on regenerated catalyst to be maintained at an extremely low level while simultaneously maintaining a favorable heat balance in the conversion unit and providing a flue gas stream having an extremely low carbon monoxide content. In one embodiment of the process of that application, the combustion of carbon monoxide to carbon dioxide is carried substantially to completion within the regeneration vessel in a relatively dilute, secondary, catalyst regeneration zone advantageously at a temperature between about 1200° and 1500° F., desirably between about 1250° and 1450° F. The temperature of the secondary zone is usually at least about 50° or 100° F. higher than that of the first regeneration zone. Partially regenerated catalyst from a relatively dense primary catalyst regeneration zone can be controllably flowed through the secondary zone in an amount and at a rate sufficient to absorb substantially all of the heat released by the combustion occurring in the secondary zone. Although most of the coke is burned from the catalyst in the primary zone, additional coke is burned from the partially regenerated catalyst while present in the secondary zone, and catalyst substantially free of coke may be recovered for recycle to the hydrocarbon conversion zone. Heat from the combustion of carbon monoxide and absorbed by the regenerated catalyst provides part of the process heat required in the hydrocarbon conversion zone. Additionally, the flue gas stream released from the secondary regeneration zone is substantially free of carbon monoxide. In a second embodiment of the process of that application substantially all of the combustion, including both the oxidation of coke or carbon on the catalyst and the oxidation of carbon monoxide, occurs within a single, relatively dense phase regeneration zone in response to the proper control of principally the regeneration temperature and gas velocity.

The present invention is directed to the discovery that the processes described in U.S. application Ser. No. 262,049, cited above, employing a cracking catalyst, particularly of the molecular sieve type, when additionally employing a platinum group metal or rhenium oxidation-promoting catalyst are very advantageous in providing regenerated catalyst having a very low coke content and in producing useful heat. The low catalyst coke levels achieved are desirably less than about 0.05 weight percent and preferably from about 0.01 to about 0.03 weight percent. The process includes the use of a cracking catalyst in association with the oxidation-promoting catalyst in a system which supports substantially complete combustion of carbon monoxide. This process can result in flue gas having carbon monoxide levels of less than about 0.2 volume percent, for example about 500 to 1000 ppm, and as low as from 0 to about 500 ppm. The process also includes provision for recovery of evolved heat by transfer directly to the conversion catalyst, particularly within the regeneration vessel. All embodiments of the process described in said U.S. application Ser. No. 262,049 are useful in carrying out the process of the present invention, and the embodiment directed to substantially complete combustion within a single, relatively dense phase catalyst is particularly advantageous.

Suitable cracking catalysts for this process include those containing silica and/or alumina, including the acidic type, and the catalysts may contain other refractory metal oxides such as magnesia or zirconia. Preferred cracking catalysts are those containing crystalline aluminosilicates known as zeolites or molecular sieves in an amount sufficient to materially increase the cracking activity of the catalyst, e.g. between about 1 and about 15 weight percent. The crystalline aluminosilicates usually have silica to alumina mole ratios of at least about 2:1, for instance about 2 to 12:1, preferably about 4 to 6:1. The crystalline aluminosilicates are usually available or made in sodium form and this component can be reduced, for instance to less than about 4, or even less than about 1, weight percent, through ion exchange with hydrogen ions, hydrogen-precursors such as ammonium ions, or polyvalent metal ions. Suitable polyvalent metals include calcium, strontium, barium, and the rare earths such as cerium, lanthanum, neodyminium, and naturally-occurring rare earths and their mixtures. The useable crystalline materials are able to maintain their pore structure under the high temperature conditions of catalyst manufacture, hydrocarbon processing and catalyst regeneration. The crystalline aluminosilicates often have a uniform pore structure of exceedingly small size with the cross-sectional diameter of the pores being in a size range of about 6 to 20 angstroms, preferably about 10 to 15 angstroms. Silica-based cracking catalysts having a major proportion of silica, e.g., about 60 to 90 weight percent silica and about 10 to 40 weight percent alumina, are suitable for admixture with the crystalline aluminosilicate or for use as such as the cracking catalyst.

The catalyst particles are finely-divided, for instance, they may have an average particle size in the range of about 20 microns or less to about 150 microns, such that they are in a form suitable for fluidization. The fluidizing gas in the dense zone of the regenerator may have a velocity, for example, in the range of from about 0.2 to 4 feet per second, desirably about 0.5 to 3 feet per second. The regeneration gas serving to fluidize the dense bed contains free or molecular oxygen, and the oxygen is preferably charged to the regeneration in an amount somewhat in excess of that required for complete combustion of coke (carbon and hydrogen) to carbon dioxide and steam. The amount of oxygen in excess of that required for complete combustion of the coke may vary from about 0.1 to about 25 or more percent of the theoretical stoichiometric oxygen requirement for complete combustion of the coke, but advantageously need not be greater than about 10 percent. For example, when air is employed as the regeneration gas a 10 percent excess of air provides only about 2 volume percent oxygen in the effluent spent gas stream. Advantageously, the concentration of molecular or free oxygen and carbon monoxide at any point within the regenerator is maintained outside of the explosive range at those conditions, preferably the concentration of carbon monoxide is below the explosive range at those conditions, to eliminate any risk of detonation.

The regeneration gas, in addition to free or molecular oxygen, may contain inert, or diluent, gas such as nitrogen, steam, etc., recycle gas from the regenerator effluent, and the like. Frequently the oxygen concentration of the regeneration gas at the inlet to the regenerator is from about 2 to 30 volume percent, preferably about 5 to 25 volume percent. Since air is conveniently employed as a source of oxygen, a major portion of the inert gas may be nitrogen. The inert gas may serve to dissipate excessive heat from the combustion of coke from the catalyst. A source of hot, inert gas is the effluent from the regenerator, and a portion of this gas may be recycled to the regenerator and, for instance, combined with sufficient incoming air or other oxygen-containing gas, including essentially pure oxygen, to provide the desired oxygen content. Thus, the recycle gas may be employed in direct heat exchange to increase the temperature of the regeneration gas to provide even further heat economies in the system.

In accordance with the present invention, the hydrocarbon cracking catalyst and the solid, platinum group metal or rhenium oxidation-promoting catalyst are employed in the regenerator vessel. The solid oxidation catalyst may be in a finely-divided form, such as a powder, separate from the hydrocarbon cracking catalyst, and thus it may be supported on another substrate, and admixed with the hydrocarbon cracking catalyst. The support for the oxidation catalyst may be less catalytically active or even inert, to the oxidation and hydrocarbon conversion reactions; and may, for instance, be ceramic in nature. Desirably, the support is porous and frequently has a surface area, including the area of the pores on the surface, of at least about 10, preferably at least about 50, square meters per gram. Illustrative of the supports, which may be essentially amorphous, are silica, alumina, silica-alumina, and the like.

The solid, platinum group metal or rhenium oxidation catalysts used in this invention may be the types used or generally known in the art to promote the oxidation of carbon monoxide in the presence of molecular oxygen. These catalysts contain a catalytic metal which promotes the oxidation, and the metal may be in a combined form, such as an oxide, rather than being in the elemental state. The oxidation catalysts are the platinum group metals of Group VIII, such as platinum, palladium and rhodium; or rhenium of Group VII. Advantageously, the solid oxidation catalyst may comprise two or more catalytically-active metals either physically or chemically combined. By a chemical combination of metals, there are included bi- or poly-metallic salts or oxides. Illustrative of combinations of catalytically-active metals which may promote oxidation of carbon monoxide without unduly adversely affecting the hydrocarbon cracking operation are combinations of the platinum group metals, e.g., platinum, and rhenium, the oxides of iron and rhenium, and the like.

One method of preparing the solid oxidation catalyst for use in the present invention is by impregnation of a suitable support with a water or organic solvent-soluble salt of the catalytically-active metal. The impregnation may be practiced in any way which will not destroy the structure of the substrate. Water-soluble nitrate salts may be employed in the impregnating solution since residue from the thermal decomposition of nitrate salts is relatively innocuous to the activity of the hydrocarbon cracking catalyst. The halogen and sulfate salts of the metal to be impregnated may be employed; however, since halogen or sulfide may be evolved during thermal degradation of the salt which may be deleterious to the activity of the hydrocarbon cracking catalyst, these methods of impregnation may often be employed when depositing the oxidation catalyst on a separate substrate which does not significantly adversely affect the hydrocarbon cracking reaction. Thus, the catalyst may be deposited on a support inert to the hydrocarbon cracking or be impregnated into a minor portion of the hydrocarbon cracking catalyst. Impregnation results in greater deposition on the surface of the substrate while ion exchange results in greater diffusion and therefore less surface deposition. In the impregnation, the metal is deposited and no significant ion exchange occurs between the metal and the substrate. In impregnating a substrate, the metal which promotes the oxidaton of carbon monoxide can be present as a water-soluble or organic solvent-soluble salt in solution in an amount sufficient to contain the quantity of metal desired on the substrate, and the substrate is contacted therewith. The composite may be dried to remove the solvent, leaving the metal deposited on the substrate. Further heating may in some instances be required to convert the metal to its active state, such as calcining or heating in hydrogen or other reactive or inert atmospheres. Alternatively, some or all of the required activation may be effected in the regeneration vessel during regeneration. Generally, in order to effect the best distribution of the metal compound on the substrate, the solution of the metal compound should be as concentrated as practical.

Another method of depositing catalytically-active metal on a substrate, particularly porous substrates such as crystalline aluminosilicates, is by adsorption of a fluid decomposable compound of the metal by the substrate followed by thermal or chemical decomposition of the metal compound. The substrate may be activated by heating to remove any adsorbed water and then contacted with a fluid decomposable compound of metal thereby adsorbing the compound into the substrate. Typical of such compounds are the metal carbonyls, metal alkyls, volatile metal halides and the like. The adsorbed compound may then be reduced thermally or chemically to its elemental metal thus leaving uniformly dispersed in the substrate an active metal for promoting oxidation of carbon monoxide to carbon dioxide. Thermal reduction may be effected in the regeneration vessel during the regeneration process.

A further method of incorporation into a support of a catalytically-active metal which promotes the oxidation of carbon monoxide comprises admixing the active metal component with a substrate precursor, for instance a silica gel or silica-alumina gel, prior to spray drying or other physical formation process, and drying the precursor to prepare the oxidation catalyst. The resultant substrate body may be calcined to form the catalytically-active material. Alternatively, heat treatment may be effected in the catalyst regenerator of the cracking system.

The substrate for the solid oxidation catalyst may be a portion of the hydrocarbon cracking catalyst, or may be different therefrom, for example, it may be a non-catalytic, porous, solid substrate. When the hydrocarbon cracking catalyst serves as the substrate, care should be taken in selection of the deposition process such that the cracking activity and selectivity of the catalyst is not adversely affected. It is preferred that if the hydrocarbon cracking catalyst is of the type having ion-exchanged sites, the ion-exchange be completed prior to deposition of the oxidation catalyst. The amount of oxidation-promoting metal employed for promotion of the oxidation of carbon monoxide may be in a minor amount effective to enhance the desired oxidation. This amount may be very small, e.g., as little as about 0.01 part per million or less based on the weight of the hydrocarbon cracking catalyst employed. The amount of oxidation-promoting metal may often be at least about 0.1 ppm. up to about 5 or about 10 ppm., and larger amounts such as about 0.01 to 5, or about 0.05 to 1, percent by weight based on the hydrocarbon cracking catalyst, may be employed.

Figure 2:
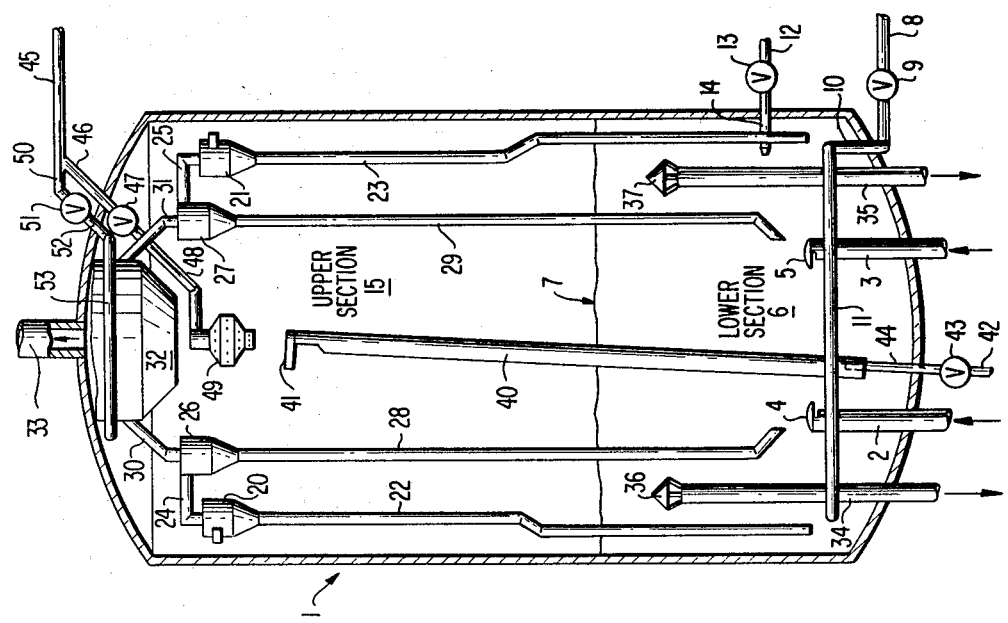

The attached drawings, FIGS. 1 and 2, provide elevational views, partly in section, of embodiments of apparatus suitable for catalyst regeneration according to the process of this invention. Regeneration of spent catalyst, especially the molecular sieve type, in various suitable hydrocarbon cracking processes, when the catalyst is in association with platinum group metal or rhenium oxidation promoting catalysts as described can be effected in an improved manner in accordance with this invention. Indeed, this improved process may be employed beneficially in many existing petroleum hydrocarbon cracking process units, particularly fluid catalytic cracking units having a variety of spatial arrangements of cracking, stripping and regeneration sections thereof.

FIG. 1 is illustrative of one embodiment of the regeneration of this invention employing bottom entry of stripped, spent catalyst passing from the cracking reactor (not shown) to the regenerator. Spent catalyst from a stripping zone associated with the catalyst exit from the reactor, enters from the bottom regeneration vessel 1, and is in physical association with a platinum group metal or rhenium oxidation-promoting catalyst. The catalyst flows upwardly through inlet lines 2 and 3 and discharges into the dense catalyst bed through discharge hands 4 and 5. The dense phase catalyst bed is maintained at a temperature of, for example, about 1200° to 1300° F., within the lower section 6 of the regenerator vessel and extends upwardly to the catalyst phase interface 7. Catalyst within the dense phase bed is fluidized by the flow of combustion air through line 8, valve 9 and line 10 to air ring 11. Substantially balanced air flow patterns through the regeneration zones may be achieved by the use of additional air rings, not shown, as required. Combustion of coke contained on the spent catalyst with air is initiated within the dense phase bed. Higher temperatures may be achieved by temporarily burning a stream of torch oil, for example a decanted oil, within the bed. Torch oil may be added by passage through line 12, valve 13 and line 14 which terminates in a nozzle located above the air ring 11. Fluidizing air velocities continuously carry some of the catalyst particles upwardly into the dilute phase zone which occupies the upper section 15 of the regenerator vessel; i.e., the section above the catalyst phase interface 7. Combustion of coke continues in the dilute phase zone and the largely spent combustion gas together with entrained catalyst is withdrawn into first stage cyclone separators 20 and 21. Most of the catalyst particles are separated in the first-stage cyclones and discharged downwardly through dip legs 22 and 23 into the dense phase zone. Gases and remaining catalyst particles are passed through interstage cyclone lines 24 and 25 to second stage cyclone separators 26 and 27 where substantially all of the remaining catalyst is separated and passed downwardly through dip legs 28 and 29 into the dense phase bed. Substantially spent combustion gas then passes through lines 30 and 31 into plenum 32 and finally is discharged from the regenerator vessel through line 33. This effluent may be suitable heat-exchanged, not shown, with refinery stream or for production of process stream. Regenerated catalyst from the dense bed is withdrawn through standpipes 34 and 35, fitted with collector heads 36 and 37, for return to the cracking reactor.

Although the supply of combustion air normally provides an excess of oxygen over the amount required to effect complete combustion of the coke on the catalyst particles to steam and carbon dioxide, combustion of coke may not be completed in the dense phase bed in one embodiment of this invention. In this situation, the combustion gases rising from the dense bed zone thus contain a substantial quantity of carbon monoxide as well as carbon dioxide and oxygen. The remaining coke on catalyst and the carbon monoxide are substantially completely burned in the dilute phase zone at a temperature of, for example, about 1250° to about 1450° F., with evolution of much heat. When carbon monoxide burns in the dilute phase a high temperature zone will usually be present throughout much of the dilute phase zone and particularly at approximately the location indicated by X and can readily be viewed through a window, not shown, at that horizontal plane. Control of regeneration temperature within the dilute phase zone is effected in part through absorption of heat by the mass of catalyst particles either carried upwardly by the rising combustion gas stream or educted upwardly from the dense bed through eductor tube 40 and catalyst distributor head 41 where a rain, or fountain, of catalyst particles disperses into the dilute phase zone. Catalyst can be educted by means of air, steam or other inert gas entering through line 42, valve 43 and jet tube 44 which extends a short distance into the lower end of eductor tube 40. Excessive temperature levels in the top section of the regenerator may be further controlled by distribution of steam, for example through lines 45 and 46, valve 47 and line 48 to steam pod 49. Temperatures in the vicinity of the plenum may also be controlled with steam fed through line 50, valve 51 and line 52 to steam ring 53 which surrounds plenum 32. Additional cooling if desired may be provided by use of a water spray, not shown, which may advantageously be directed within the region of interstage cyclone lines 24 and 25.

FIG. 2 is illustrative of another embodiment of this invention employing side entry of stripped, spent catalyst in physical association, with a platinum group metal or rhenium oxidation-promoting catalyst from the cracking reactor to the regenerator. Spent catalyst enters regeneration vessel 101 flowing downwardly through inlet line 102 located on the side of the regeneration vessel to provide entry into the dense phase catalyst bed maintained within bottom section 106 a short distance below catalyst phase interface 107. Fluidization of the catalyst is effected by combustion air passing through line 108, valve 109 and line 110 to air ring 111. Additional air rings, not shown, may be employed as desired for further balancing of air flow patterns through the regeneration zones. As described in FIG. 1, combustion of coke on the spent catalyst particles is initiated within the dense phase zone where higher temperatures as desired may be achieved by temporary burning of a torch oil stream within the zone. Such torch oil may be added through line 112, valve 113 and line 114 terminating in a nozzle.

Fluidizing air velocity may be controlled to continuously carry catalyst particles upwardly for purposes of heat absorption into the dilute phase zone which occupies the upper section 115 of the regenerator vessel; i.e., the section above the catalyst phase interface 107. Combustion of coke as well as of carbon monoxide may continue in the dilute phase zone to provide regenerated catalyst particles containing about 0.01 to about 0.05 weight percent coke and the largely spent combustion gas together with the entrained portion of catalyst particles is withdrawn into first stage cyclone separators 120 and 121. Most of these catalyst particles are separated in the first stage cyclones and discharged downwardly through dip legs 122 and 123 into the dense phase zone. Gases and remaining catalyst particles subsequently pass through interstage cyclone lines 124 and 125 to second stage cyclone separators 126 and 127 where substantially all of the remaining catalyst is separated and passed downwardly through dip legs 128 and 129 into the dense phase bed. Substantially spent combustion gas then passes through lines 130 and 131 into plenum 132 and finally is discharged from the regenerator vessel through line 133. Regenerated catalyst from the dense bed is withdrawn through standpipes 134 and 135, fitted with collector heads 136 and 137, for return to the catalytic cracking reactor.

As described for the embodiment of FIG. 1, carbon monoxide burns in the dilute phase providing a high temperature zone throughout much of the dilute phase zone and particularly at approximately the location indicated by X. Control of regeneration temperature within the dilute phase zone is effected largely through absorption of heat by the mass of catalyst particles carried upwardly by the rising combustion gas stream. Temperatures in the vicinity of the plenum, cyclone and connecting lines may, as required, be reduced with steam fed through line 150, valve 151, and line 152 to steam ring 153 which surrounds plenum 132. Water spray means, not shown, may similarly be employed.

In another, particularly preferred embodiment of this invention, the apparatus shown in FIG. 2 is employed with a significant change in operating parameters as compared to the above described embodiment. In this embodiment gas velocity and catalyst particle input are adjusted so that essentially complete combustion of coke and carbon monoxide is completed within the the dense phase and the heat is dispersed throughout the bed. The stabilization of the combustion reaction is particularly enhanced by the employment of the oxidation-promoting catalyst and the regenerator is thereby able to be operated at lower temperatures or to combust greater quantities of carbon monoxide and thus regenerate more catalyst at the same temperature.

Suitable hydrocarbon feedstocks for the cracking process include various mineral oil fractions boiling above the gasoline range such as light gas oils, heavy gas oils, widecut gas oils, vacuum gas oils, kerosenes, decanted oils, residual fractions, reduced crude oils and cycle oils derived from any of these, as well as suitable fractions derived from shale oil, tar sands processing, synthetic oils, coal hydrogenation and the like. Such fractions may be employed singly or in any desired combination.

Beneficially, the process of the present invention enables considerable coke and carbon monoxide to be combusted in the dense phase zone wherein a substantially increased amount of catalyst particles as compared to the dilute phase zone, is present to disperse the heat evolved therefrom. As the portion of combustion occurring in the dense phase zone is increased, the evolution of heat in the dilute phase zone is substantially reduced, hence, the need to provide rapid catalyst turnover in the dilute phase zone to absorb the evolved heat is reduced or eliminated.

A particularly desirable use of the process of this invention is an integral part of the fluid cracking unit employing a fluidizable cracking catalyst, as described above, in a transport, or "riser", reactor with attendant provision for stripping of spent, coke catalysts, followed by regeneration of the spent catalyst according to the process of this invention. Preferably, cracking occurs essentially exclusively in the riser reactor and a following dense catalyst bed is not employed for cracking. In a typical case where riser cracking is employed for conversion of a gas oil, the throughput ratio, or volume ratio of total feed to fresh feed, may vary from about 1 to 2. The conversion level may vary from 40 to about 100 weight percent, and advantageously is maintained above about 60 weight percent, for example, between about 60 and 90 weight percent. By conversion, it is meant the percentage reduction by weight of hydrocarbons boiling above about 430° F. at atmospheric pressure by the formation of lighter materials or coke. The weight ratio of catalyst to oil in the riser reactor may vary within the range from about 2 to 10 in order that the fluidized dispersion will have a density within the range from about 1 to 5 pounds per cubic foot. Desirably, the catalyst/oil ratio is maintained at no greater than about 5 and preferably within the range from about 3 to 5. The fluidizing velocity in the riser reactor may range from about 20 to 60 feet per second. The riser reactor should preferably be substantially vertical, having a ratio of length to average diameter of at least about 25. For production of a typical naphtha product, the bottom section mixing temperature within the riser reactor is advantageously maintained at about 1000° F. for substantially complete vaporization of the oil feed, and so that the top section exit temperature will be about 950° F. Under these conditions, including provision for a rapid separation of spent catalyst from effluent oil vapor, a very short period of contact between catalyst and oil will be established. Contact time within the riser reactor will generally be within the range from about 3 to 10 seconds, and preferably within the range from about 3 to 7 seconds. Shorter contact times are preferred because most of the hydrocarbon cracking occurs during the initial increment of contact time, and the undesirable secondary reactions are avoided. This is especially important if higher product yield and selectivity, including lesser coke production, are to be realized.

Short contact time between catalyst particles and oil vapors may be achieved by various means. For example, catalysts may be injected at one or more points along the length of a lower, or bottom, section of the riser. Similarly, oil feed may be injected at all the points along the length of the lower section of the riser reactor and a different injection point may be employed for fresh and recycle feed streams. The lower section of the riser reactor may, for this purpose, include up to about 80 percent of the total riser length in order to provide extremely short effective contact times inducive to optimum conversion of petroleum feeds. Where a following dense catalyst bed is employed, provision may also be made for injection of catalyst particles and/or oil feed directly into the dense bed zone. Although the conversion conditions set forth above are directed to the production of gasoline as fuel for spark-ignition internal combustion engines, the processing scheme may be suitably varied to permit maximum production of heavier hydrocarbon products such as jet fuel, diesel fuel, and heating oil.

The spent catalyst from the petroleum conversion reactor is preferably stripped prior to entering the regenerator. The stripping vessel for use in a fluidized bed catalytic cracking unit may suitably be maintained essentially at conversion reactor temperature in the range from about 850° to 1050° F. and desirably will be maintained at about 950° F. Preferred stripping gas is steam although nitrogen, other inert gas or flue gas may be employed, introduced at a pressure, usually in the range from 10 to 35 p.s.i.g., suitable to effect substantially complete removal of volatile compounds from the spent conversion catalyst.

Stripped spent catalyst particles may enter the dense bed section of the regenerator vessel through suitable lines and valving from the stripping vessel. Entry may be from the bottom or from the side, desirably near the top of the dense bed fluidized zone. Entry may also be from the top of the regenerator where catalyst has first been contacted with substantially spent regeneration gas in a restricted dilute phase zone.

Catalyst particles, with the oxidation-promoting catalyst, within the dilute phase may partially be carried into the separation zone, usually comprising cyclone separators in a plurality of stages, from which catalyst can be returned directly through dip legs to the dense bed zone, and spent regeneration and combustion gases are collected in a plenum and finally discharged for suitable recovery of heat energy contained therein. Recovery processes for heat from flue gas include steam regeneration, spent catalyst stripping, indirect heat exchange with various refinery streams, particularly with feed to the particular conversion process, and employment in various drying or evaporation arrangements.

When the system is operated according to either of the first two above-described embodiments in which CO is burned in the dilute phase, recovery of the heat released by the essentially complete combustion of coke and CO may be by absorption in catalyst particles in both phases, and return of the catalyst to the dense phase serves also to secure maintenance of the suitably high temperature within the dense phase zone. The returned catalyst particles may carry with them additional heat to serve to raise the temperature of the dense phase zone to a temperature which favors additional removal of coke deposits thereon such that the combustion of the final increments of coke becomes substantially complete. When the system is operated so that essentially all combustion is completed within the dense catalyst phase, the heat is dispersed throughout the phase as it is absorbed by the fluidized particles and final increments of coke are combusted. Accordingly, in all embodiments, the regenerated catalyst passing from the regenerator back to the cracking reactor suitably contains from about 0.01 to about 0.10 weight percent, desirably 0.01 to 0.05 weight percent and preferably about 0.01 to about 0.03 weight percent carbon or coke, and can be withdrawn from the regenerator at an advantageous temperature for use in the cracking reactor.

The regenerated catalyst particles having unusually low residual coke content, are recovered from the dense phase and passed at the substantially dense bed temperature through a standpipe to the cracking reactor for contacting with fresh hydrocarbon feed or mixture thereof with recycle hydrocarbon fractions. Since the catalytic oxidation of the carbon monoxide evolved from the combustion of the coke deposits on the catalyst may occur to a major extent in the dense phase and in the preferred embodiments essentially completely occurs in the dense phase, the regenerated catalyst can be returned to the cracking reactor at a much higher temperature as well as a higher activity than heretofore conventional operations.

Many fluid cracking units are operated on the "heat balance" principal, depending upon combustion of coke for the evolution of heat required in the process. Such units, however, have not been able to fully utilize the benefits of the cracking catalysts, particularly zeolite catalysts, which can especially be achieved in a riser reactor where contact times between catalysts and oil vapors may be extremely short. The type of operation which affords high conversion coupled with high selectivity, favors a low ratio of catalyst to oil in the riser reactor which leads to less coke being available to generate heat by combustion in the regenerator. Accordingly, an external heat source such as a feed preheat furnace, may frequently be added to increase the temperature of the catalyst or, alternatively, the unit may be operated at a lower temperature of fresh feed. Such undesirable features may be avoided or minimized by the process of this invention which permits efficient recovery of additional heat by regenerated catalyst particles for transfer to the riser reactor. The heat of combustion of coke in conventional operations is about 12,000 BTU per pound. The process of this invention may increase available heat by combustion of the coke to about 17,000 or more BTU's per pound. This higher heat of combustion tends to raise the regenerator temperature, lower the level of coke on the regenerated catalyst, and lower the catalyst circulation rate while providing improved yields at a given conversion level.

A further benefit from the regeneration processes of this invention relates to the unusually low carbon monoxide content in the effluent gas stream from the regenerator which may be obtained. Whereas flue gas from conventional regeneration of cracking catalysts usually contains from about 6 to 10 percent carbon monoxide, a similar amount of carbon dioxide and very little oxygen, the flue gas from regeneration in accordance with this invention generally contains less than about 0.2 percent, and often no more than about 5 to 500 parts per million, carbon monoxide. The oxygen content of the flue gas is, of course, not of primary importance from an ecological point of view and may vary from about 0.1 to about 10 percent, advantageously being within the range from about 1 to about 3 percent and preferably no more than about 2 percent in order to restrict the amount of flue gas and conserve heat within the regeneration reactor system. If required, any remaining carbon monoxide may suitably be burned in the exhaust from the regenerator flue gas stack. From a process point of view, heat recovery by downstream combustion of carbon monoxide in a carbon monoxide boiler or afterburner arrangement may be avoided employing the process of this invention, with consequent substantial savings in process equipment and operational costs while still meeting the existing standards for ambient air quality for carbon monoxide emissions.

The following examples are illustrative of the process of this invention.

EXAMPLE I

Mid-continent gas oil (23.4° API) having a boiling range from 650° to 1050° F. is cracked in a fluidized transport-type reactor at an average cracking temperature of 960° F. The throughput ratio (weight total feed/weight fresh feed) is 1.34 and the total feed rate is 36,000 bbl/day. The catalyst particles are circulated at a rate of 19.6 tons/minute. The weight of ratio of catalyst to oil in the cracking zone is 3.7.

Effluent from the riser reactor is passed to a separation zone and fed into a cyclone separator. Hydrocarbon products are removed and spent catalyst is passed downwardly through the cyclone dip leg into a stripping zone maintained at 950° F. The settled catalyst is stripped with steam to remove remaining volatile material prior to regeneration.

Stripped spent catalyst, containing 0.9 wt. % coke on catalyst, is fed into the bottom section of a regenerator vessel of the type shown in FIG. 2 where it is fluidized with air in a dense phase catalyst bed maintained at 1250°–1275° F. (average temperature is 1260° F.) by combustion of coke and occasional combustion of torch oil as required. The air rate is set at about 290,000 lbs./hr. to provide approximately 14.0 lbs. air per lb. coke on spent catalyst. Catalyst is entrained in the rising air stream and carried into the dilute phase catalyst zone in the upper portion of the regenerator vessel above the interface with the dense bed. Combustion of carbon monoxide is completed within the dilute phase zone at a temperature of about 1400° F. Gases and entrained catalyst are passed from the dilute phase zone into a series of cyclone separators with catalyst being returned directly to the dense phase zone. The gas stream leaving the cyclone system is passed first to a plenum area located at the top of the regenerator vessel and then is discharged at 1250° F. Catalyst is withdrawn from the dense phase bed as required through a standpipe at 1250° F. for return to the transport reactor.

Analysis of the regenerated catalyst indicates the residual coke content to be only 0.03 wt. %. Analysis of the effluent gas indicates the carbon monoxide content to be 0.0 vol. % and the oxygen content to be 1.9 vol. %. The cracking conversion is 67.7 vol. % on feed. From heat balance calculations coke is burned at the rate of 20,700 lbs./hr., liberating 17,800 BTU/lb. coke. Of the total heat evolved, over 80% is absorbed in the regenerated catalyst and thus kept within the cyclic fluid cracking system.

EXAMPLE II

The same system, feedstock and reactor conditions as those of Example I may be employed using the regeneration vessel of FIG. 2 but the regeneration gas velocity and particle flow rate may be adjusted to provide for absorption of the heat from the essentially complete combustion of the coke and CO by the catalyst in the dense phase bed in the vessel. Carbon monoxide levels as low as 8 ppm. may be achieved by the process of this invention, while achieving coke removal and heat recovery similar to that achieved in Example I above.

It is claimed:

1. A composition of matter comprising a particulate physical mixture of:
    (a) particulate solid cracking catalyst for cracking hydrocarbons; and
    (b) particulate solid oxidation promoter comprising an amount effective to promote the oxidation of carbon monoxide to carbon dioxide of platinum group metal or rhenium supported on a substrate which is substantially inert to hydrocarbon cracking and substantially free of crystalline aluminosilicate zeolite, said amount of platinum group metal or rhenium being in the range from about 0.01 part per million up to less than about 1 part per million based on the weight of (a).

2. A composition of claim 1 wherein the oxidation promoter comprises platinum group metal.

3. A composition of claim 2 wherein the platinum group metal comprises platinum.

4. A composition of claim 1 wherein (a) contains crystalline aluminosilicate zeolite having pores in the size range of about 6 to 20 Angstrom units.

5. A composition of claim 1, 2 or 3 wherein the substrate of (b) comprises a member selected from the group consisting of silica, alumina and silica-alumina.

6. A composition of claim 5 wherein (a) contains crystalline aluminosilicate zeolite having pores in the size range of about 6 to 20 Angstrom units.

7. A composition of claim 1, 2 or 3 wherein the substrate of (b) comprises alumina.

8. A composition of claim 7 wherein (a) contains crystalline aluminosilicate zeolite having pores in the size range of about 6 to 20 Angstrom units.

9. A composition of claim 4 wherein the crystalline aluminosilicate zeolite of (a) is about 1 to about 15 weight percent of (a).

10. A composition of claim 1 wherein the amount of platinum group metal or rhenium is in the range from about 0.01 part per million to about 0.5 part per million based on the weight of (a).

11. A composition of claim 1 wherein the amount of platinum group metal or rhenium is about 0.1 part per million based on the weight of (a).

* * * * *